J. G. LACY.
Cultivator and Potato Digger.
No. 125,057. Patented March 26, 1872.
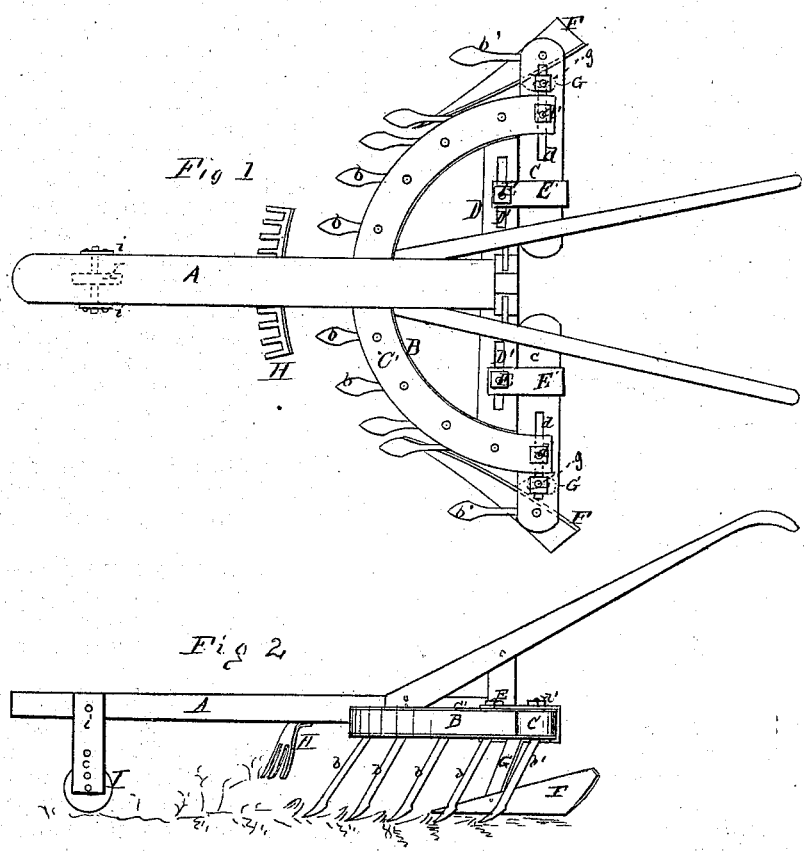
Witnesses
Inventor
J. G. Lacy,
Chipman Hosmer & Co,
Attys.

125,057

UNITED STATES PATENT OFFICE.

JOSEPH G. LACY, OF EUREKA, WISCONSIN.

IMPROVEMENT IN CULTIVATORS AND POTATO-DIGGERS.

Specification forming part of Letters Patent No. 125,057, dated March 26, 1872; antedated March 13, 1872.

*To all whom it may concern:*

Be it known that I, JOSEPH G. LACY, of Eureka, in the county of Winnebago and State of Wisconsin, have invented a new and valuable Improvement in Combined Cutivators and Potato-Diggers; and I do hereby declare that the following is a full, clear, and exact description of the construction and operation of the same, reference being had to the annexed drawing making a part of this specification and to the letters and figures of reference marked thereon.

Figure 1 of the drawing is a representation of a plan view of my invention. Fig. 2 is a side view of my invention.

This invention has for its object certain improvements in combined cultivators and potato-diggers; and the novelty consists in the application and arrangement of an adjustable slide, holding a shovel-plow, and adjustable mold-board, in connection with a segmental cultivator and potato-digger, as hereinafter described.

In the accompanying drawing illustrating this invention, A represents a cultivator draft-beam, to the under side of which is secured a semicircular or segmental beam, B, provided with a series of cultivator shovels, b. C C are a pair of short slides arranged behind the beam B. C' represents a semicircular plate, which covers the beam B, and extends at its ends over the slides C C. There are two of these plates, one on top and one underneath the beam B. The slides C C have long slots d d cut in them, and are secured to the plates C' by means of bolts d' d', which pass through said slots, and have nuts turned onto their upper ends. D designates a transverse bar bracing the ends of the beam B. In said bar a slot, D', is cut on each side of the draft-beam, through which slot a bolt, E, passes, and secures a pair of cleats, E', attached to the upper and lower side of one of the slides C. The above-described arrangement of these slides renders them adjustable. F represents a pair of mold-boards located at the outer ends of the slides C, and within the compass or behind the shovels b b', the latter (b') being attached to the slides. These mold-boards are attached to the slides by means of adjustable slotted standards G, through which pass bolts g, entering the slots in the slides C. The mold-boards may be adjusted by moving the slides or the bolts g or the standards G.

When the implement is to be used for digging potatoes the mold-boards are to be removed and the slides pushed to the center of the bar D. H indicates a rake attached to the under side of the draft-beam, and designed for the purpose of taking hold of and clearing away the vines. I is a roller journaled to a pair of standards, i, depending from the draft-beam. The roller may be raised or lowered to different positions.

For the purpose of cultivating corn every other shovel or tooth b should be removed. The points of the mold-boards are to be turned in or out in cultivating corn, according as it is desired to throw much or little earth toward the corn.

I claim as my invention—

1. In a cultivator and potato-digger, the adjustable slide C with shovel b', and adjustable mold-board F, substantially as and for the purpose set forth.

2. The herein-described cultivator, consisting of the draft-beam A, semicircular beam B, rake H, plates C', and the adjustable slides C, provided with the mold-boards F, substantially as and for the purpose specified.

In testimony that I claim the above invention I have hereunto subscribed my name in the presence of two subscribing witnesses.

JOSEPH G. LACY.

Witnesses:
E. DENISON,
S. J. WAITE.